Patented Aug. 27, 1940

2,212,521

UNITED STATES PATENT OFFICE 2,212,521

CHEMICAL SUBSTANCE AND USE THEREOF

Benjamin R. Harris, Chicago, Ill., assignor to Colgate-Palmolive-Peet Company, Jersey City, N. J., a corporation of Delaware No Drawing. Original application April 3, 1935, Serial No. 14,527. Divided and this application October 21, 1936, Serial No. 106,708

10 Claims. (Cl. 260—400)

My invention relates to a new class of chemical substances, and more in particular to a new class of chemical substances particularly adapted for use as detergent, penetrating, emulsifying, lathering, flotation, anti-spattering or frothing purposes or reducing the surface tension of water.

My present application is a division of my application Serial No. 14,527, filed April 3, 1935, which is, in turn, a continuation in part of my application, Serial No. 640,501, filed October 31, 1932, now Patent No. 2,023,387, issued December 3, 1935.

In certain classes of industries, there is a need for a certain class of chemical substances usually used in relatively small quantities but capable of use in larger quantities to secure an effect principally the result of a wetting action such as at a water-oil interface. In the textile and leather treating industries, for example, there are many situations where a wetting or detergent action is imperative and many different chemical substances have been produced calculated to reduce surface tension and promote wetting in these industries. The use of prior art substances has not been attended with unqualified success in all instances. In certain other types of industries, such as the margarine industries, for example, problems in preventing the spattering of margarine in frying have arisen.

The principal object of my present invention is the provision of a new class of chemical substances capable of satisfactory use in connection with the problems hereinabove discussed.

Another object is the provision of a new class of chemical substances which are in general of relatively simple structure and can be cheaply made in commercial quantities.

Another object is the provision of a class of chemical substances of the character set forth which in many instances will be innocuous and non-toxic, even though employed in such foods as margarine.

Another object is the provision of a new class of chemical substances having improved wetting characterisitics.

Another object is the provision of a new class of substances with great utility in the treating of textile materials.

Other objects and features of the invention will be apparent from a consideration of the following detailed description.

Broadly speaking, the class of substances with which I am concerned are designated as hydrophilic lipins. One of the outstanding characteristics of the substance is the presence of lipophile and hydrophile groups in the molecule. A portion of the molecule has groups which are easily wetted by oils. This lipophile group in the substances which I have investigated is a radical of predominantly hydrocarbon characteristics, though it may also be an alcohol, ether, or ester group, or some other group as will appear from the illustrations given below. The lipophile group has marked affinity for oils and fats, is readily capable of being wet by oleaginous media, and in general, at the water-oil interface, tends to cause the molecule, of which it is a part, so to orientate itself, apparently, that the lipophile group may stand in relatively closer proximity to the oil medium or phase, as contrasted with the aqueous medium. The hydrophilic portion of the molecule is a group which is easily wetted by water, and among these groups are such groups as OH groups or OH groups and sulphate groups. I have pointed out that if the hydrophilic lipin contains a hydrophile group which will sufficiently balance the lipophile group, then such substance, when used in small proportions, will act as an anti-spatterer preventing the spattering during frying of margarine made from milk and oleaginous material.

The lipophilic group is preferably of moderately high molecular weight, as will be seen from illustrations given below; however, the preferred magnitude of the molecular weight of the lipophilic group varies with the character of the hydrophilic group or groups coacting with it. Generally speaking, sufficient lipophilic mass and quality must be present in the molecule to properly offset and balance the hydrophilic group. An excess of lipophilic characteristics is undesirable, since, in such a case, the substance as a whole becomes predominantly lipophile, becomes rather freely fat soluble, no longer orientates itself as readily at the interface of water and oil in the margarine emulsion and hence (assuming the employment of the substance in a margarine emulsion), largely loses its anti-spattering power. The above is merely a hypothesis which appears to fit the discovered facts and helps to explain them.

Chemically, the substances of my present invention are in general ester derivatives of moderately high or high molecular weight fatty acids or ether derivatives of moderately high or high molecular weight alcohols, with at least one semi-esterified sulphuric acid group. In certain circumstances, there may be more than one semi-esterified sulphuric acid group or there may be sulphuric acid groups that are totally esterified and other sulphuric acid groups that are semi-esterified, but in all cases there must be at least one semi-esterified sulphuric acid group. The sulphuric acid group may be an acid sulphate group, but for my purposes is preferably neutralized with a suitable cation such as sodium, potassium or other metals, or ammonia, or a suitable amine such as tri-ethanol amine, or the like, all as more fully explained hereinafter.

Considering the compounds from another aspect, the molecule in each instance contains a relatively high molecular weight lipophile group or groups and a hydrophile group or groups which, in the class of compounds to which my present invention relates, are principally sulphuric acid radicals which may or may not be neutralized. From still another angle, the compounds may be considered as combinations of a higher molecular weight lipophile group and the sulphate group linked together by means of a third group which is generally a polyhydroxy organic compound with at least two esterifiable hydroxy groups. A more complete understanding of what may comprise the lipophile groups and the intermediate radical which links the hydrophile group to the lipophile group will be had as the detailed description progresses.

I therefore have a substance containing a sulphate group and a lipophilic group of a sufficient molecular weight to balance the sulphate group. This substance may be a good anti-spattering substance when used in connection with margarine if the "balance" is sufficient; or it may function well in other industries as a wetting, penetrating, emulsifying, frothing, or detergent agent.

The function of the sulphuric acid groups is to impart hydrophilic properties, that is, water wetting or water attracting properties, to the molecule as a whole. When some types of neutralizing agents are used, this action is enhanced. The groups with which the sulphuric acid group is linked are in general of a lipophile character. At times they may be strongly lipophilic and at other times moderately lipophilic. They may be of comparatively low molecular weight (for example with 4 carbon atoms), or of moderately high molecular weight (with say from 8 to 16 carbon atoms), or of distinctly high molecular weight (having 36 carbon atoms, for example), depending upon the purpose for which the substance may be used. Furthermore, the group or groups with which the sulphuric acid is esterified may have hydrophilic radicals of their own. An example of this type of substance is lauryl glyceryl sulphate (sodium salt):

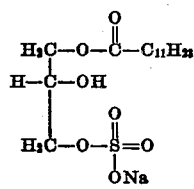

It is evident that in the above substance the molecule which is esterified with sulphuric acid is monolaurin, which happens to have a hydrophilic radical of its own, namely, the unesterified hydroxy group in the glycerol residue.

It should also be observed that the lipophile function in the above molecule is dependent principally upon the lauryl group. The hydrophile function is dependent principally upon the sulphate group. Furthermore, these two groups are linked together by means of a polyhydroxy substance, namely, glycerol.

Some additional examples of members of the group of substances which I have discovered are as follows:

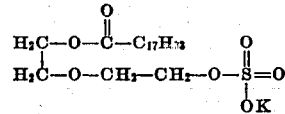

Mono-oleyl diethylene glycol sulphate (potassium salt)

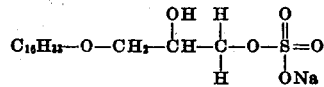

Cetyl glycerol sulphate (sodium salt)

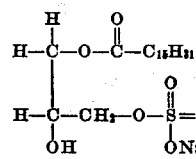

Palmityl glycerol sulphate (sodium salt)

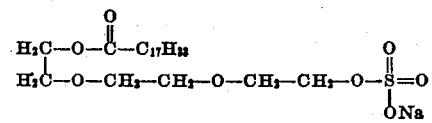

Mono-oleyl triethylene glycol sulphate (sodium salt)

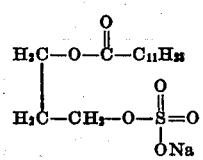

Lauryl trimethylene glycol sulphate (sodium salt)

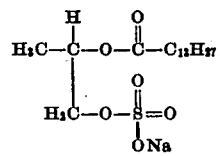

Myristyl propylene glycol sulphate (sodium salt)

Sulphonated monostearyl glucose

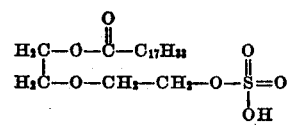

Mono-oleyl diethylene glycol sulphate

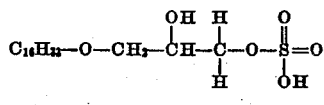

Cetyl glycerol sulphate

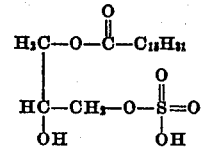

Palmityl glycerol sulphate

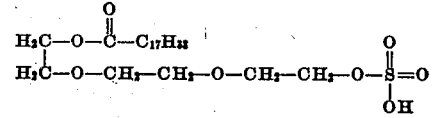

Mono-oleyl triethylene glycol sulphate

Lauryl trimethylene glycol sulphate (ammonium salt)

Myristyl propylene glycol sulphate (ethanol amine salt)

Octoyl diglycerol sulphate (sodium salt)

Hexyl diglycerol sulphate

Caproyl ethylene glycol sulphate

Melissyl butylene glycol sulphate (ammonium salt)

Palmityl sorbitol sulphate (sodium salt)

αβ-dilaurin sulphate (sodium salt)

Sulphonated cetyl glycerate

Lauryl mannitol sulphate

Octoyl diglycerol sulphate (sodium salt)

Hexyl diglycerol sulphate (sodium salt)

Caproyl ethylene glycol sulphate (potassium salt)

Melissyl butylene glycol sulphate (ammonium salt)

Mono-oleyl diethylene glycol sulphate (tri-ethanolamine salt)

Cetyl glycerol sulphate (potassium salt)

Mono-oleyl di-ethylene glycol sulphate (barium salt)

Mono-oleyl ethylene glycol sulphate (tri-amylamine salt)

Lauryl di-ethylene glycol sulphate (ammonium salt)

Mixed cocoanut oil fatty acid esters of dextrose sulphates

Lauryl ether of diethylene glycol sulphate (ammonium salt)

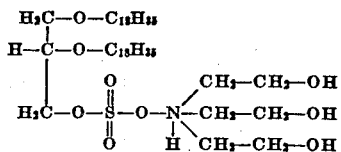

α,β di-oleyl ether of glycerol sulphate (triethanol amine salt)

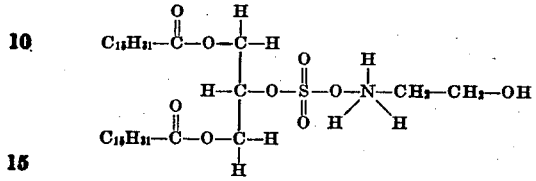

Dipalmytin sulphate (monoethanol amine salt)

Di-lauric acid ester of glucose sulphated (sodium salt)

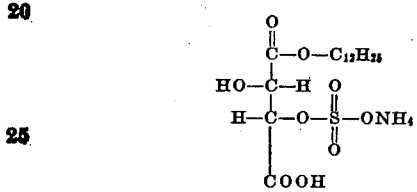

Sulphate of lauryl tartrate (ammonium salt)

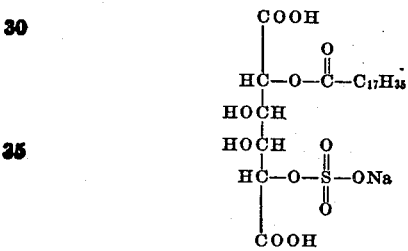

Stearic acid ester of mucic acid sulphate (sodium salt)

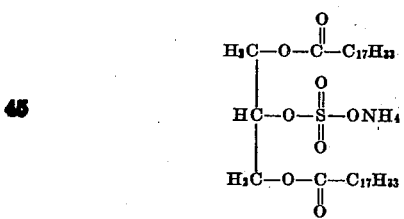

Ammonium salt of di-olein sulphate

In the above examples I have not illustrated any di-sulphate compounds. In any of the formulae containing a free hydroxy group, such free hydroxy group may be sulphated. Indeed, in many cases in which a mono-ester of a polyhydroxy substance, such as glycerol, is treated to form the sulphuric acid ester, a portion of the mono-ester molecules will be esterified at more than one hydroxy group, thus producing a mixture. By controlling the amount of reagent and time, temperature and conditions of reaction, I am able to control the degree of sulphation with dependable and sufficient accuracy to produce the type of substance desired.

While the above list of the illustrative embodiments of my invention indicates single, pure substances only, it must be understood that mixtures may very well be used, either mixtures of single substances prepared independently or mixtures produced as such. For example, instead of esterifying diethylene glycol with lauric acid and then esterifying the resultant ester with sulphuric acid, I can employ a mixture of cocoanut fatty acids, such as is obtained from cocoanut oil, and esterify this mixture of fatty acids with diethylene glycol to form a mixture of the monofatty acid esters of diethylene glycol. This mixture I then esterify with sulphuric acid or chlorsulphonic acid to give me the finished product, which may be used as such, or which may be further treated to neutralize it.

As sources of lipophile groups I may employ any one of a large number of substances having lipophilic properties or mixtures thereof, these substances being in general relatively high molecular weight carboxylic acids, specifically fatty acids, and relatively high molecular weight alcohols having definite lipophilic properties. Examples of such substances are caprioc, capric, capryllic, valeric, butyric, abietic, melissic, hydroxystearic, benzoic, benzoylbenzoic, naphthoic, toluic, palmitic, stearic, lauric, oleic, elaidic, myristic, ricinoleic, linoleic, and naphthenic acids, acids derived from animal and vegetable fats and oils including fish oils and the like, hydrogenated vegetable oils, alcohols resulting from the reduction of the fatty acids of vegetable and animal fats and oils, cetyl alcohol, lauryl alcohol, octyl alcohol, melissyl alcohol and other acids or alcohols of the same general character having lipophile characteristics giving the substance a marked affinity for oils and fats. As an example of another type of substance, I wish to call attention to octyl alcohol having a branched chain, for example 2-ethyl-hexanol. This particular alcohol can be used with good results and is named merely as an illustration of another type of lipophile substance which can be employed with good results.

For the purpose of linking the lipophile and sulphate groups, I may employ any one of a large number of substances characterized generally by the presence of at least two esterifiable hydroxy groups besides glycerol, glycols and polymers thereof referred to hereinabove and utilized in many of the examples given. I may employ many other polyhydroxy substances of which the following are illustrative: mucic acid, tartaric acid, saccharic acid, gluconic acid, glucuronic acid, gulonic acid, mannonic acid, trihydroxy-glutaric acid, glyceric acid, hydroxy carboxylic oxidation products of polyglycerols, xylose, galactose, fructose, maltose, sucrose, glucose, diethylene glycol, sorbitol, dulcitol and arabitol. Of the glycols employed, good results are obtained by using either ethylene glycol or di-ethylene glycol, a selection being made in accordance with the conditions under which the product is produced and the use to which it is put. When employing polymers of glycerine, I may use a substantially pure diglycerol or triglycerol, for example, but generally I employ a mixture of polymerized glycerols.

The sulphate group or groups, as previously stated, may be left unneutralized or may be neutralized with suitable inorganic or organic neutralizing agents. Examples of inorganic neutralizing agents which may be used satisfactorily are ammonia gas, ammonium hydroxide, sodium carbonate, sodium hydroxide, potassium carbonate, potassium hydroxide, bicarbonates, anti-acid materials of the alkali earth group and also other anti-acid materials, in which case the hydrogen of the sulphate group or groups is replaced by a cation such as sodium, potassium, ammonium, calcium, magnesium, aluminum, zinc, etc. I may also employ organic nitrogenous materials for the purpose of neutralizing the sulphate groups. Examples of organic substances adapted for the purpose are amines, quaternary ammonium hydroxides and other anti-acid organic nitrogenous substances, ethylene di-amine, mono, di- and tri-ethanolamine amyl amines, tetraethyl ammonium hydroxide, pyridine, quinoline, quinaldine, aniline, dimethyl aniline, etc. An additional advantage of those substances which are salts of hydroxyalkyl amines is that they are particularly resistant to salting out by acids, alkalis and salts.

For the purpose of introducing the sulphate groups I may employ sulphuric acid, concentrated or fuming, chlor-sulphonic acid, sulphuryl chloride, sulphur tri-oxide, solutions of sulphur tri-oxide and other so-called sulphonating agents. The treatment with these agents may take place in the presence or absence of solvents and condensing agents such as pyridine and the like.

The method for introducing the sulphate group differs in different cases and is dependent upon the material which is to be esterified with the sulphuric acid and the purpose for which the resultant product is to be employed.

An example of one of my methods is as follows. Monostearine is treated at room temperature with 2½ parts by weight of concentrated sulphuric acid (sp. gr. 1.84) and allowed to react about 15 hours. The product is then washed substantially free of excess sulphuric acid and then neutralized to form the salt of the sulphonated monostearine. Care should be taken by mixing or otherwise to get the sulphuric acid into an intimate homogeneous admixture with the monostearine. For washing, hot brine at a temperature of about 75° to 80° gives the greatest satisfaction inasmuch as under these conditions the fat material separates in a distinct supernatant layer and facilitates the separation of the wash water in each successive washing. The product thus obtained contains a considerable proportion of water and in addition to the principal product, namely, monostearine sulphate (sodium salt) contains besides, some unreacted monostearine and free stearic acid. If desired the substance may be purified.

Monolaurin and other mono fatty acid esters of glycerol and other hydroxy organic substances may likewise be treated by the procedure just described.

Still another satisfactory method is the one I followed in preparing lauryl diethylene glycol sulphate (ammonium salt) which is as follows. 10 parts by volume of monolauryl diethylene glycol dissolved in 20 parts by volume of chloroform are cooled in ice water. 1½ parts by volume of chlorsulphonic acid dissolved in 10 parts by volume of chloroform are now slowly added with vigorous stirring to the first chloroform solution, at such a rate as not to raise the temperature of the reaction mixture appreciably. After all the chlorsulphonic acid solution has been introduced, the reaction mixture is aspirated with a dry inert gas, to carry out most of the hydrochloric acid formed during the reaction. Finally, ammonia gas is passed into the mixture to neutrality. The chloroform may then be distilled off or evaporated. The product thus obtained has a remarkable power for lowering the surface tension of water, even at very low concentrations, and has many other useful properties of the character described in the early part of the specification.

Another method of carrying out the invention for producing the sulphate substances is as follows: Into 60 parts of the mono fatty acid esters of diethylene glycol, prepared from mixed cocoanut oil fatty acids, I mix 9 parts of ethylene dichloride, using any effective mixing or kneading equipment capable of performing good agitation in relatively stiff compositions. The mixture is cooled down to a temperature of approximately minus 5 to minus 10 degrees C., with the agitators in motion, and 23 parts of well chilled chlorsulphonic acid, diluted with about 3 parts of ethylene dichloride, are slowly added, the mixture material being vigorously agitated. Suitable provisions are made to remove the hydrochloric acid evolved during the reaction. During the sulphating step, a temperature of around minus 10 degrees C. is maintained by suitable means such, for example, as the employment of a cooling jacket, a cooling coil, or the addition of coarsely ground carbon dioxide or other refrigerating material at intervals during the introduction of the chlorsulphonic acid. One suitable method is to introduce the solid carbon dioxide and chlorsulphonic acid alternately and in such amounts that the temperature of approximately minus 10 degrees is maintained with fair uniformity.

With the agitators still running at high speed about 15 to 17 parts of mono ethanol amine are gradually added to the sulphated product prepared as above, the temperature of the material being maintained at approximately minus 5 to minus 10 degrees C. When all of the mono ethanol amine has been introduced and neutralization completed, which may be determined by the reaction of the product to litmus, 40 parts of the ester identical with the ester originally used in the sulphating step are stirred in until a smooth free-flowing paste is obtained. This paste is then stored at room temperature in a convenient vessel for a sufficient time to permit the settling out of a small proportion of insoluble salt and the escape of emulsified air and carbon dioxide.

The product so produced is a slightly turbid to clear oil, depending upon the length of settling, of slightly viscous but flowing consistency. This product functions particularly in wetting-out, emulsifying, frothing and other interface modifying functions. It possesses the additional advantage of being soluble in petroleum oils and waxes, aromatic hydrocarbons and other oleaginous materials, thereby facilitating the preparation of so-called soluble oils and the like, and making possible many modes of utilization not possible with substances which are not soluble in such media.

The product sulphated as above described may similarly be neutralized with other anti-acid substances and the same general character of product is obtained. Similarly the neutralized substance and method described in connection with the foregoing example may also be employed for neutralizing substances prepared in accordance with other examples given hereinabove.

Another method which is capable of wide application for the preparation of my sulphuric acid esters is as follows: A fatty acid (or a mixture of fatty acids), a polyhydroxy substance (or a mixture of polyhydroxy substances) and a sulphating agent (or mixture of sulphating agents) are allowed to react with each other in a mixture comprising the three reagents and the resulting sulphuric ester is isolated in a suitable form. An illustrative example of this method is the reaction of stearic acid, glycerine and sulphuric acid, which I describe in detail in the following paragraph.

53 parts of fuming sulphuric acid (30% SO₃ content), 106 parts of concentrated sulphuric acid (sp. gr. 1.84) and 47 parts of chemically pure gylcerine, all previously cooled to approximately 40° C. are mixed in such a manner that the resulting temperature is approximately 65 degrees C. The mixture is allowed to stand for about fifteen minutes and is cooled down to about 55 degrees C. 53 parts of commercial triple pressed saponified stearic acid melted to a temperature of 85 degrees C. are stirred into the mixture first prepared. The resulting mixture of the three substances is allowed to remain at rest for about four hours and is then diluted with about 900 parts of water. 80 parts of common salt are now dissolved in the mixture and the brine is allowed to separate out as a lower layer which is then siphoned off. 900 parts of additional water are added, salt introduced and another separation made by siphoning off the underlying brine layer. There is now present a small residual portion of sulphuric acid which is neutralized with caustic soda and finally finished with sodium bicarbonate. This neutralized mixture is now heated until a supernatant fat layer is obtained. The underlying brine is again siphoned off and the fatty layer, after being tested for moisture content, is adjusted to have a moisture content of approximately 60%. It is now stirred until contact with the atmosphere has reduced its temperature substantially to ordinary room temperature. Physically, the resulting product is a paste of medium consistency which lends itself well to incorporation with aqueous media, water-oil emulsions, etc. Chemically, the potent ingredients of the product are fatty acid esters of glycerol with hydrophilic sulphate groups. The product is a mixture the exact nature of which may vary somewhat.

With proper precautions so that temperatures are held under control and not permitted to rise to decomposition points, other polyhydroxy substances such as dextrose may similarly be converted into analogous esters in the above example. It is obvious, of course, that other fatty acids and other sulphonating agents may be employed so that substantially any of the types of products described in the present specification may be made by this method. Where rigorous requirements as to purity and the like are present, it may be advisable to employ other methods given by way of example, particularly when dealing with certain classes of reagents.

Those of my substances which are freely soluble in water may be recovered from their solutions in the customary manner by concentrating and crystallizing. As the mass of the lipophile radical increases solubility in water tends to decrease and affinity for water is manifested by dispersibility in water. From these aqueous dispersions my substances may be readily recovered by "salting out" with suitable soluble electrolytes. Common salt is very satisfactory for this purpose in most cases. When salted out of an aqueous dispersion at temperatures ranging from 60° to 95° C., the substances are obtained in the form of a paste with a water content ranging from approximately 25 to 75 percent. The more hydrophilic the substance, the greater the water content and, of course, the salt is present in the water of the paste in approximately the same concentration in which it existed in the dispersion from which the product was salted out. The product may be treated to remove the salt.

The compounds of my invention, although in many respects differing from each other in accordance with the numerous examples given and description of the variations in their properties, nevertheless many of them may be represented by the structural formula

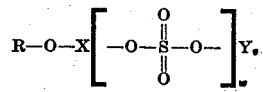

wherein R is an alkyl, acyl, or some other lipophile group, O is oxygen, X represents the residue of the organic hydroxy substance which links together the lipophile group with the hydrophilic sulphate group, S stands for sulphur, Y is a cation, and $w$ and $v$ are small whole numbers, at least one.

Some of my substances may also be represented by the formula

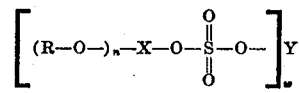

wherein R is an alkyl or acyl radical, X is the residue of an aliphatic polyhydroxy substance with at least two esterifiable hydroxy groups remaining after combining the polyhydroxy substance with at least one lipophile group and at least one hydrophile sulphate group, Y is a cation, and $w$ and $n$ are integers.

Some of my substances may also be represented by the formula

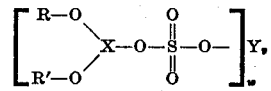

wherein R and R' represent lipophile groups which together are the lipophile portion of the molecule as a whole, X is the residue of an aliphatic polyhydroxy substance with at least three esterifiable hydroxy groups, Y is a cation, and $w$ and $v$ are small integers. In general, the lipophile group in substances represented by this formula should have less than 18 carbon atoms, although substances of this character may be employed in which the lipophile groups contain more than 18 carbon atoms.

I have also found that the addition of certain materials to the substances with which my invention is concerned, as hereinabove described, markedly enhances their capacity to lower the surface tension of water, their serviceability as "wetting-out agents" in the textile treating industry, and markedly improves many of their other valuable colloidal properties. These addition agents are principally the more or less lipophile ethers and esters of the hydroxy organic substances which I employ for esterifying with sulphuric acid or its equivalent in order to produce the sulphuric esters described hereinabove. Notably useful for this purpose are mono-oleyl diethylene glycol, mixed mono acid esters of diethylene glycol with mixed cocoanut fatty acids, mixed mono acid esters of glycerol with mixed cocoanut fatty acids, mono caprylin and the like.

Thus the addition agents are hydrophilic lipins characterized by being aliphatic derivatives of water soluble polyhydroxy substances having at least one free OH group. While these hydrophilic lipins in themselves may not be sufficiently balanced to have a marked effect either to prevent spattering of oleomargarine or decrease interfacial tension in water-oil emulsions as in the case of the hydrophilic lipins containing a semiesterized sulphuric acid group, they will have the effect of so modifying the surface phenomena of the latter in contact with an aqueous medium so as to affect the interfacial surface, surface tension and the penetrating and wetting properties.

I have made extensive experiments to determine the effect of the addition agents in increasing the wetting properties of my new sulphate compounds. It will be sufficient for an understanding of this phase of the invention to give a few illustrative examples. In the case of mono-olein di-sulphate which in itself is a good wetting agent, I found that substituting for some of the mono-olein di-sulphate in the treating bath approximately 40% of mono-oleyl diethylene glycol produced greatly improved wetting action. For example, in the case of the mono-olein di-sulphate, one-tenth of a gram dissolved in 100 cc. of water showed a surface tension of 40 dynes per centimeter. With six one-hundredths of a gram of mono-olein di-sulphate and four one-hundredths of a gram of mono-olein diethylene glycol also dissolved in 100 cc. of water, I found that the surface tension was decreased to 34 dynes per centimeter. In the same way, I found that while sulphates of mixed cocoanut fatty acid esters of diethylene glycol were good wetting agents, the wetting action was greatly increased by the addition of a proportion of mono-oleyl diethylene glycol. In the case of mono-laurin sulphate used as a wetting agent, I found that I also obtained improved results by the use therewith of a proportion of mono-caprylin. The surface tension of water under the conditions in which the above data were established was 72 dynes per centimeter. By selecting one of the sulphate compounds of my present invention and a suitable addition agent of the class hereinabove described, I have found that very much better wetting action is obtained than by the use of any other known wetting agent with which I am familiar.

It will be noted that while my sulphuric esters in themselves produce a considerable lowering of surface tension, this effect is enhanced by the addition of the fatty acid esters, notwithstanding the fact that the concentration of the sulphuric esters proper is diminished.

It is to be noted that while I have chosen the lowering of the surface tension of water as a convenient means of illustrating the effect of these addition agents, this surface tension lowering is by no means their sole effect as they radically influence other valuable colloidal characteristics of the medium into which they are introduced as well as influencing the surface tension.

The substances which I add to my sulphuric esters for the purpose of enhancing their useful colloidal properties, may be represented by the structural formula:

$$(R-O)_w X(-OH)_v$$

wherein R is an alkyl, acyl, or some other lipophile group, O is oxygen, H is hydrogen, $w$ and $v$ are small whole numbers, at least one, and X represents the residue of an organic hydroxy substance with at least one free hydroxy group remaining after combining said organic hydroxy substance with at least one lipophile group.

In the preceding specification, I have employed the term "hydrophilic lipin" in several places in a broad sense. That there may be no misunderstanding of the use of this term, the manner in which it is used, and the relationship of the improved compounds of my invention thereto, I wish to point out again from the standpoint of its terminology the manner in which the compounds of my present invention are produced.

I select preferably in the first instance a compound (or in some cases a mixture of compounds) which has both a lipophilic group and a hydrophilic group. The compounds which I employ initially, however, are dominantly lipophilic, the hydrophile group, in most cases for example a single "OH" group, being of insufficient strength or character to affect the more dominant lipophile group to any great extent. I then attach to the lipophile group, preferably at a hydroxy carboxyl group, a hydroxy or poly-hydroxy substance which in itself has some hydrophilic characteristics. A suitable example as previously set out are glycerols and glycols and poly-compounds thereof. I then attach a sulphate group to the hydroxy radical by sulphonation, as previously described.

Many processes employed in producing the improved compounds of my invention yield materials having a proportion of water mixed therewith. In most cases, the material is suitable for use in this condition without being dehydrated. It can be dispersed readily in additional amounts of water down to concentrations of, for example, one-tenth per cent or less as in the illustration given above. In certain cases, however, the material may require dehydration either partially or entirely. Due to their pronounced hydrophilic properties, these materials however tend to retain some moisture in them even under very rigorous dehydration treatment so that except in extreme cases it may be said that the materials always have a proportion of moisture present.

It will be noted that while the strictly rigorous sense of the term "sulphonation" denotes the introduction of a sulphonic acid group, I have used this term throughout in the sense that it is employed technically in the industries. In every instance, sulphonation as employed in this specification denotes the formation of an ester of sulphuric acid.

I have described my invention in detail in order that those skilled in the art may practice the same, but it is obvious that I do not restrict myself to the specific details described, the invention being limited only by the scope of the appended claims.

The term "poly" is used in the specification and claims in the usual sense, to denote more than one.

The term "residue" is employed in its ordinary accepted sense to connote that which remains after the reaction of certain groups. Thus, for example, where glycerin, a polyhydroxy substance, is reacted with a fatty acid, such as lauric acid, to produce a mono ester and is then treated with sulphuric acid or the like to produce mono laurin mono sulphate, the "residue" of the polyhydroxy substance is

Throughout the specification and claims, the term "residue" is to be regarded as possessing the above connotation.

This application is a division of my application for Chemical substance and use thereof, Serial Number 14,527, filed April 3, 1935, which was copending with my application for Wetting agent, Serial Number 640,501, filed October 31, 1932. The latter application, now Reissue Patent No. 20,636, refers to and was copending with my application Serial Number 475,622 filed August 15, 1930 (Patent No. 1,917,250), a continuation in part of my application Serial Number 383,143 filed August 2, 1929.

I claim:

1. A chemical substance of the following formula:

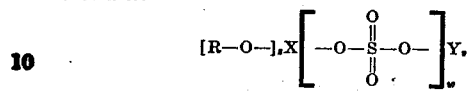

in which R represents a carboxylic acid radical, X is a residue of a polymer of an aliphatic polyhydroxy substance which links together the lipophile radical and the sulphate group, Y is a cation, and $z$, $w$, and $v$ are small whole numbers, at least one.

2. A chemical substance of the following formula:

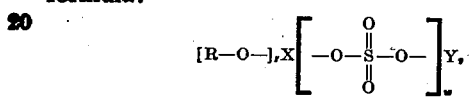

in which R represents a fatty acid radical containing at least 4 carbon atoms, X is a residue of a polymer of an aliphatic polyhydroxy substance which links together the lipophile radical and sulphate group, Y is a cation, and $z$, $w$, and $v$ are small whole numbers, at least one.

3. A chemical substance of the following formula:

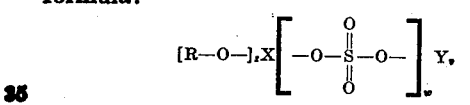

in which R represents a fatty acid radical having at least 4 carbon atoms, X is a residue of a polymer of glycerin which links together the lipophile radical and the sulphate group, Y is a cation, and $z$, $w$, and $v$ are small whole numbers, at least one.

4. A chemical substance of the following formula:

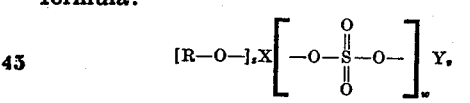

in which R represents a fatty acid radical having at least 4 carbon atoms, X is a residue of a polymer of glycol which links together the lipophile radical and the sulphate group, Y is a cation, and $z$, $w$, and $v$ are small whole numbers, at least one.

5. A chemical substance of the following formula:

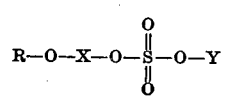

in which R represents a fatty acid radical having at least 4 carbon atoms, X is the residue of a polymer of an aliphatic polyhydroxy substance which links together the lipophile radical and the sulphate group, and Y is a cation.

6. A chemical substance of the following formula:

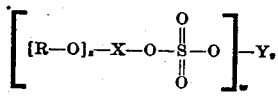

in which R represents a fatty acid radical from cocoanut oil, X is a residue of a polymer of an aliphatic polyhydroxy substance which links together the radical and the sulphate group, Y is a cation, and $z$, $w$, and $v$ are small whole numbers, at least one.

7. A chemical substance of the following formula:

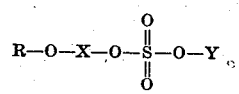

in which R represents a fatty acid radical from cocoanut oil, X is a residue of a polymer of an aliphatic polyhydroxy substance which links together the radical and the sulphate group, and Y is a cation.

8. A chemical substance of the following formula:

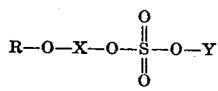

in which R represents a fatty acid radical from cocoanut oil, X is a residue of a polymer of glycerin which links together the radical and the sulphate group, and Y is a cation.

9. A chemical substance of the following formula:

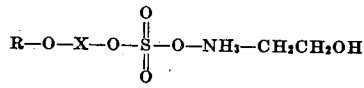

in which R represents a cocoanut fatty acid radical and X is a residue of a polymer of glycerine which links together the radical and the sulphate group.

10. A chemical substance of the following formula:

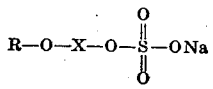

in which R represents a cocoanut fatty acid radical and X is a residue of a polymer of glycerine which links together the radical and the sulphate group.

BENJAMIN R. HARRIS.